United States Patent
Wang et al.

(10) Patent No.: US 10,572,748 B2
(45) Date of Patent: Feb. 25, 2020

(54) AUTONOMOUS VEHICLE ADAPTIVE PARALLEL IMAGE PROCESSING SYSTEM

(71) Applicant: GM GLOBAL TECHNOLOGY OPERATIONS LLC, Detroit, MI (US)

(72) Inventors: Shige Wang, Northville, MI (US); Wei Tong, Troy, MI (US); Shuqing Zeng, Sterling Heights, MI (US); Roman Millett, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 247 days.

(21) Appl. No.: 15/833,382

(22) Filed: Dec. 6, 2017

(65) Prior Publication Data
US 2019/0171895 A1    Jun. 6, 2019

(51) Int. Cl.
*G06K 9/00* (2006.01)
*G06F 9/48* (2006.01)
*G05D 1/02* (2020.01)

(52) U.S. Cl.
CPC ....... *G06K 9/00993* (2013.01); *G05D 1/0246* (2013.01); *G06F 9/4887* (2013.01); *G06K 9/00791* (2013.01); *G06K 9/00805* (2013.01); *G06K 9/00973* (2013.01); *G06K 9/00986* (2013.01); *G05D 2201/0213* (2013.01)

(58) Field of Classification Search
CPC .......... G06K 9/00993; G06K 9/00986; G06K 9/00791; G06K 9/00973; G06K 9/00805; G06F 9/4887; G05D 1/0246; G05D 2201/0213
See application file for complete search history.

(56) References Cited

U.S. PATENT DOCUMENTS

| | | | | |
|---|---|---|---|---|
| 7,788,667 B2 * | 8/2010 | Jiang | ..................... | G06F 9/4887 709/207 |
| 7,954,101 B2 * | 5/2011 | Adachi | ................. | G06F 1/3203 718/102 |
| 8,484,279 B1 * | 7/2013 | Cole | ..................... | G06F 9/5044 709/201 |
| 8,539,494 B2 * | 9/2013 | Saxe | ..................... | G06F 9/5027 718/103 |
| 8,631,415 B1 * | 1/2014 | Nadathur | .............. | G06F 9/5088 712/10 |
| 8,856,303 B2 * | 10/2014 | Anand | ................ | H04L 41/0806 709/223 |

(Continued)

*Primary Examiner* — Xuemei G Chen
(74) *Attorney, Agent, or Firm* — Lorenz & Kopf, LLP

(57) ABSTRACT

An adaptive parallel imaging processing system in a vehicle is provided. The system may include, but is not limited to, a plurality of processors and a resource management system including, but not limited to, an execution monitor, the execution monitor configured to calculate an average utilization of each of the plurality of processors over a moving window, and a service scheduler controlling a request queue for each of the plurality of processors, the service scheduler scheduling image processing tasks in the respective request queue for the each of the plurality of processors based upon the average utilization of each of the plurality of processors, the capabilities of each of the plurality of processors, and a priority associated with each image processing task, wherein an autonomous vehicle control system is configured to generate the instructions to control the at least one vehicle system based upon the processed image processing tasks.

19 Claims, 4 Drawing Sheets

(56) References Cited

U.S. PATENT DOCUMENTS

| | | | | |
|---|---|---|---|---|
| 8,856,793 B2* | 10/2014 | Picinich | | G06F 9/485 |
| | | | | 718/102 |
| 8,988,501 B2* | 3/2015 | Iwasaki | | H04N 21/2393 |
| | | | | 348/43 |
| 9,020,901 B2* | 4/2015 | Chi | | G01N 21/6486 |
| | | | | 707/654 |
| 9,491,114 B2* | 11/2016 | Matousek | | H04L 47/762 |
| 9,600,290 B2* | 3/2017 | Inoue | | G06F 9/5088 |
| 9,740,266 B2* | 8/2017 | Huang | | G06F 1/3206 |
| 10,108,201 B2* | 10/2018 | Engdahl | | B60L 9/00 |
| 10,255,525 B1* | 4/2019 | Totolos, Jr. | | G06T 7/70 |
| 10,274,952 B2* | 4/2019 | Cantrell | | B64C 39/024 |
| 10,296,382 B2* | 5/2019 | Alrashed | | G06F 9/4887 |
| 2003/0101084 A1* | 5/2003 | Otero Perez | | G06F 9/4881 |
| | | | | 718/105 |
| 2005/0155032 A1* | 7/2005 | Schantz | | G06F 9/505 |
| | | | | 718/100 |
| 2008/0209425 A1* | 8/2008 | Ferris | | G06F 9/45537 |
| | | | | 718/102 |
| 2011/0212761 A1* | 9/2011 | Paulsen | | G06T 15/005 |
| | | | | 463/25 |
| 2012/0204186 A1* | 8/2012 | Davidson, II | | G06F 9/4881 |
| | | | | 718/104 |
| 2017/0139749 A1* | 5/2017 | Jamjoom | | G06F 9/4881 |
| 2018/0120858 A1* | 5/2018 | Perez Barrera | | G05D 1/0246 |
| 2018/0232260 A1* | 8/2018 | Shows | | G06F 9/5061 |
| 2018/0307921 A1* | 10/2018 | Vallespi-Gonzalez | | |
| | | | | G06K 9/00369 |
| 2019/0004535 A1* | 1/2019 | Huang | | G05D 1/0251 |
| 2019/0064793 A1* | 2/2019 | Sun | | G01C 21/3469 |
| 2019/0080602 A1* | 3/2019 | Rice | | G08G 1/096725 |
| 2019/0088006 A1* | 3/2019 | Yamamoto | | G06T 15/205 |

* cited by examiner

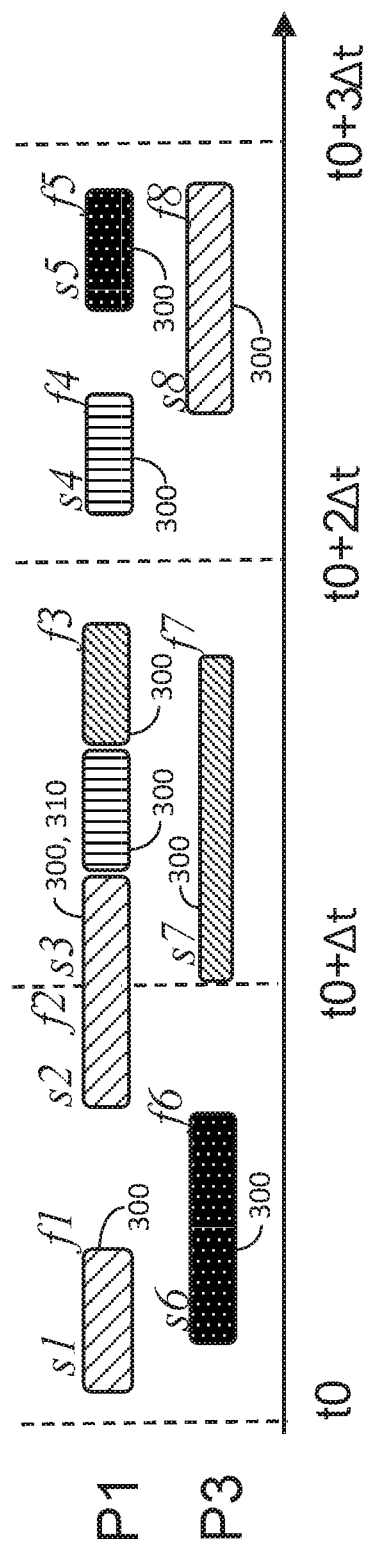

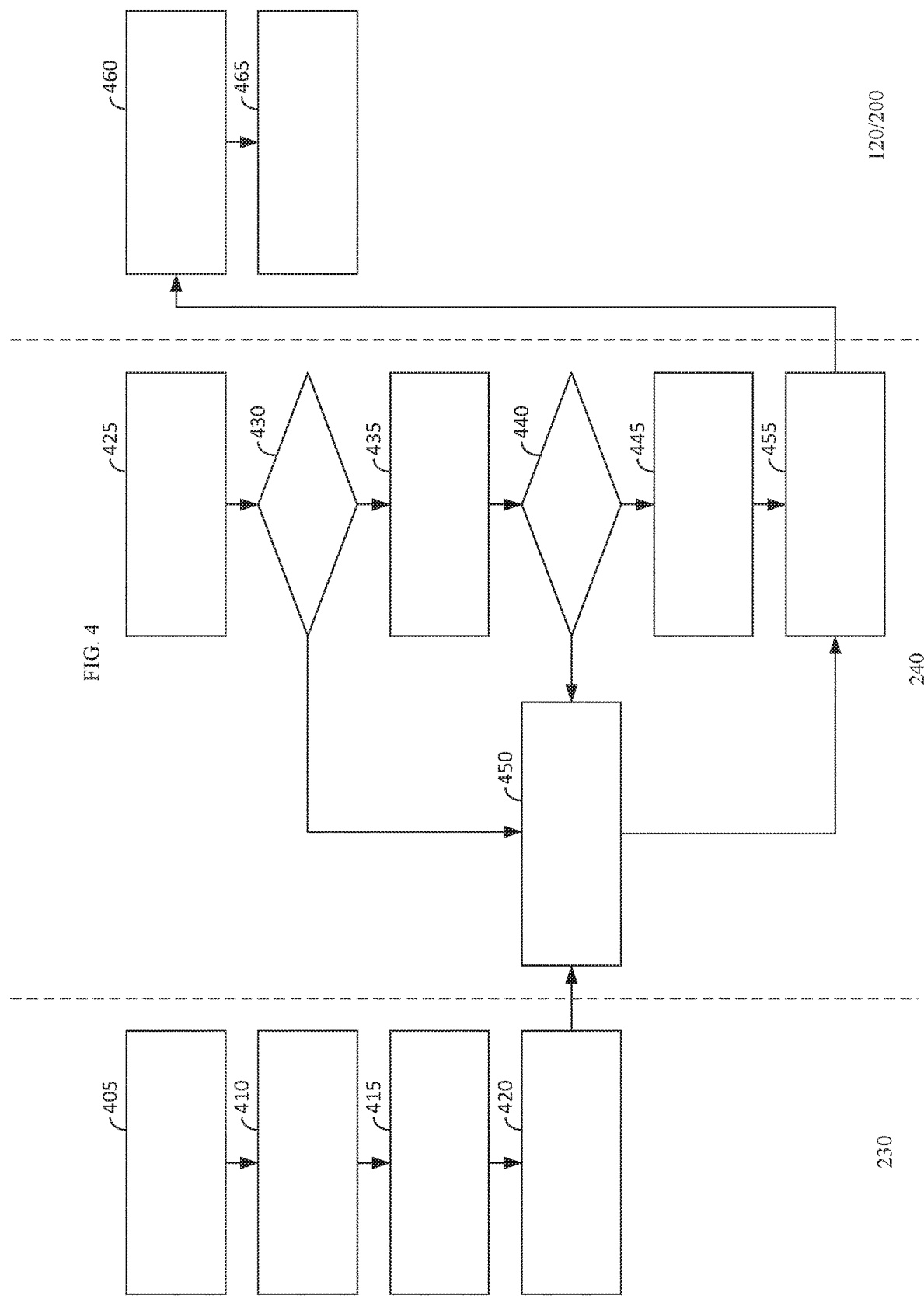

AUTONOMOUS VEHICLE ADAPTIVE PARALLEL IMAGE PROCESSING SYSTEM

INTRODUCTION

The present invention generally relates to vehicles, and more particularly relates to autonomous vehicle control.

Vehicles are often equipped with multiple sensors used to either aid a driver in operating a vehicle or to take control of the vehicle in certain circumstances. The sensors may collect extremely large amounts of data which have to be processed quickly enough such that meaningful aid or control instructions are generated contemporaneously with a need.

Accordingly, it is desirable to improve the efficiency and speed at which the data from the sensors is processed. Furthermore, other desirable features and characteristics of the present invention will become apparent from the subsequent detailed description of the invention and the appended claims, taken in conjunction with the accompanying drawings and the background of the invention.

SUMMARY

In one embodiment, for example, a vehicle is provided. The vehicle may include, but is not limited to, at least one vehicle system controlling at least one of a steering, a braking and an acceleration of the vehicle, a vehicle motion control system control system, the vehicle motion control system configured to generate instructions to control the at least one vehicle system, and an autonomous vehicle control imaging system, including, but not limited to, a plurality of vehicle sensors, and an adaptive parallel imaging processing system configured to process image data from the plurality of sensors, including, but not limited to, a plurality of processors, and a resource management system, the resource management system including, but not limited to an execution monitor, the execution monitor configured to calculate an average utilization of each of the plurality of processors over a moving window, and a service scheduler, the service scheduler controlling a request queue for each of the plurality of processors, the service scheduler scheduling image processing tasks based upon image data from the plurality of sensors in the respective request queue for the each of the plurality of processors based upon the average utilization of each of the plurality of processors over the moving window, capabilities of each of the plurality of processors, and a priority associated with each image processing task, wherein the plurality of processors are configured to process image processing tasks in order according to the respective request queue for each of the plurality of sensors and the autonomous vehicle control system is configured to generate the instructions to control the at least one vehicle system based upon the processed image processing tasks.

In another embodiment, for example, a method for controlling an autonomous vehicle control system for a vehicle is provided. The method may include, but is not limited to, receiving, by an adaptive parallel imaging processing system, image data from a plurality of sensors, determining, by an execution monitor of the adaptive parallel imaging processing system, an average utilization of each of a plurality of processors of the adaptive parallel imaging processing system over a moving window, scheduling, by a service scheduler of the adaptive parallel imaging processing system, image processing tasks into a request queue for each of the plurality of processors based upon the average utilization of each of the plurality of processors over the moving window, capabilities of each of the plurality of processors, and a priority associated with each image processing task, processing, by each of the plurality of processors, image processing tasks from the respective request queue associated with each of the plurality of processors, and generating, by the autonomous vehicle control system, instructions to control at least one vehicle system based upon the processed image processing tasks, the instructions controlling at least one of an acceleration, a braking and a steering of the vehicle.

In yet another embodiment, for example, an autonomous vehicle control imaging system is provided. The autonomous vehicle control imaging system configured to generate instructions to control at least one vehicle system, the autonomous vehicle control system including, but not limited to a plurality of vehicle sensors, and an adaptive parallel imaging processing system configured to process image data from the plurality of sensors, including, but not limited to, a plurality of processors, and a resource management system, the resource management system including, but not limited to an execution monitor, the execution monitor configured to calculate an average utilization of each of the plurality of processors over a moving window, and a service scheduler, the service scheduler controlling a request queue for each of the plurality of processors, the service scheduler scheduling image processing tasks based upon image data from the plurality of sensors in the respective request queue for the each of the plurality of processors based upon the average utilization of each of the plurality of processors over the moving window, capabilities of each of the plurality of processors, and a priority associated with each image processing task, wherein the plurality of processors are configured to process image processing tasks in order according to the respective request queue for each of the plurality of sensors and the autonomous vehicle control system is configured to generate the instructions to control the at least one vehicle system based upon the processed image processing tasks.

BRIEF DESCRIPTION OF THE DRAWINGS

The present invention will hereinafter be described in conjunction with the following drawing figures, wherein like numerals denote like elements.

FIG. 3 is a chart illustrating an example of the utilization of processors P1 and P3 from Tables 1 and 2, in accordance with an embodiment; and FIG. 4 illustrates a method for operating the adaptive parallel image processing system, in accordance with an embodiment.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
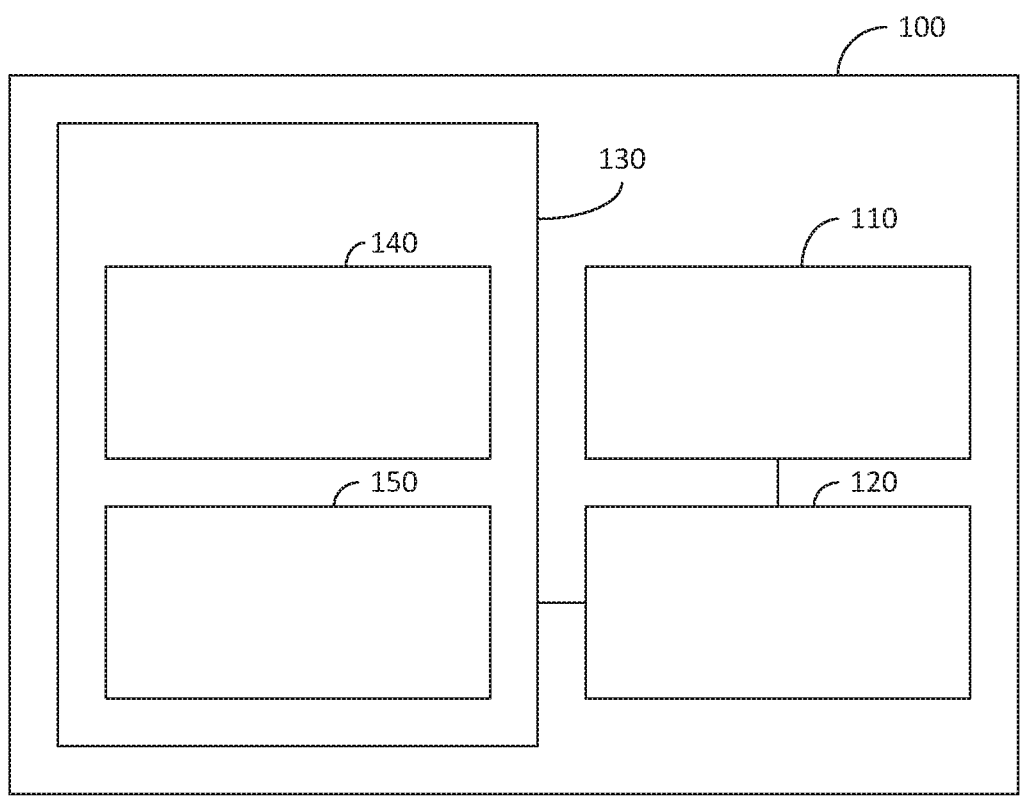
FIG. 1 is a block diagram of a vehicle, in accordance with an embodiment.

FIG. 1 is a block diagram of a vehicle 100, in accordance with an embodiment. In one embodiment, for example, the vehicle 100 may be an automobile such as a sedan, a sports utility vehicle, a truck, a crossover or the like. However, in other embodiments, the vehicle 100 may be a motorcycle, an aircraft, a spacecraft, a watercraft, or any other land craft or any combination thereof. The vehicle 100 includes one or more vehicle systems 110. Each vehicle system 110 may control one or more of an acceleration of the vehicle 100, a braking of the vehicle 100, a steering of the vehicle 100, a transmission of the vehicle 100 or the like.

The vehicle 100 further includes a vehicle motion control system 120. The autonomous vehicle control imaging system 130 may generate instructions for one or more of the vehicle systems 110 to accelerate the vehicle 100, to brake the vehicle 100, to steer the vehicle 100, to operate a transmission of the vehicle 100 (e.g., to switch from reverse to drive), or the like. In one embodiment, for example, the instructions may be presented to a driver of the vehicle 100 via a visual display, via an audio generator, via a tactile feedback system, or the like, or any combination thereof. In another embodiment, for example, the instructions may autonomously be carried out by the respective vehicle system 110. In yet other embodiments, a combination may be performed. In other words, the instructions may be presented to a driver and, if the driver does not response quickly enough to the instruction, the autonomous vehicle control imaging system 130 may execute the instructions.

The vehicle 100 further includes an autonomous vehicle control imaging system 130. The autonomous vehicle control imaging system 130 includes multiple vehicle sensors 140. The vehicle sensor 140 may include, for example, one or more optical cameras, infrared cameras, radar sensors, light detection and ranging (LIDAR) sensors, ultrasound sensors, or the like, or any combination thereof The autonomous vehicle control imaging system 130 processes images generated by the vehicle sensors 140, the processed images being the basis for which the vehicle motion control system 120 generates instructions for the vehicle systems 110.

In order to process the data generated by the vehicle sensor 140, the autonomous vehicle control imaging system 130 further includes an adaptive parallel imaging processing system 150. The adaptive parallel imaging processing system 150 utilizes dynamic resource management to utilize multiple processors to process the data from the vehicle sensor 140 quickly and efficiently.

Figure 2:
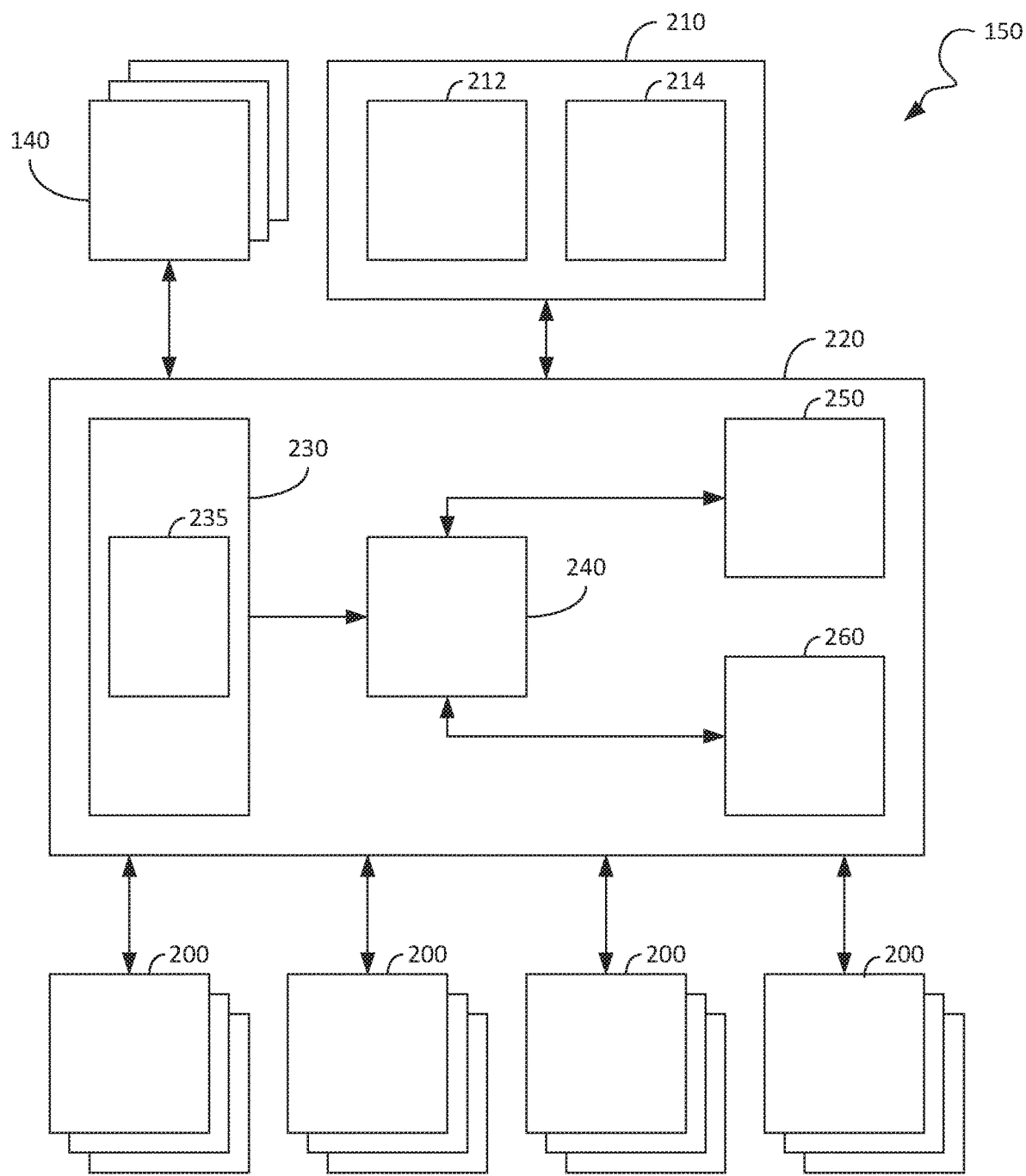
FIG. 2 is a block diagram of the adaptive parallel imaging processing system, in accordance with an embodiment.

FIG. 2 is a block diagram of the adaptive parallel imaging processing system 150, in accordance with an embodiment. The adaptive parallel imaging processing system 150 includes multiple processors 200. The processors 200 may include one or more central processing units (CPUs), graphic processing units (GPUs), application specific integrated circuits (ASICs), field programmable gate arrays (FPGAs), digital signal processors (DSPs), or any other logic device or any combination thereof The adaptive parallel imaging processing system 150 further includes a memory 210. The memory 210 may be any combination of volatile and non-volatile memory. The memory 210 may also store non-transitory computer readable instructions for implementing the adaptive parallel imaging processing system 150, as discussed in further detail below.

Each processor 200 may have different capabilities. For example, a CPU may be able to process image data from all of the vehicle sensor 140 and perform all stages of the image processing. However, an ASIC or a FPGA may be programmed to only process image data from only one type of the vehicle sensor 140 or a subset of the types of vehicle sensor 140, a single image processing task, or a subset of the image processing tasks. The capabilities of each processor are stored as processor capabilities 212 stored in the memory 210. In one embodiment, for example, the processor capabilities may be stored as a table, such as Table 1 below:

TABLE 1

| Processor | Processor Type | Capabilities |
|---|---|---|
| P1 | CPU | K1, K2, K3, K4 |
| P2 | CPU | K1, K2, K3, K4 |
| P3 | FPGA | K1, K3, K4 |
| P4 | FPGA | K2 |
| P5 | GPU | K1, K2, K3, K4 |
| P6 | ASIC | K3, K4 |

In Table 1, K1, K2, K3 and K4 may represent different sensor types of the vehicle sensor 140 or different image processing tasks. For example, K1 may represent optical cameras, K2 may represent radar sensors, K3 may represent a first filter applied to image data and K4 may represent a second filter which is applied to image data. However, Table 1 is merely an example. The number of processors 200, the types of processors 200 and the capabilities of each processor 200 can vary depending upon the needs of the system. For example, a system may contain a processor with 4 CPU cores, two GPUs, and an FPGA. A convolutional neuro network algorithm may be used to determine pedestrians in an image stream from a camera, and another algorithm based on optical flow is used to determine the motion of neighboring vehicles. The CPU cores may be capable of performing a color conversion for the neural network algorithm and an optical flow for the neighboring vehicles algorithm. The FPGA may used to run a convolutional layer as part of the neuro network algorithm. The GPUs may be used for a pooling layer of the neural network algorithm and the optical flow for the neighboring vehicles algorithm. Depending on the driving situation, for example on a local road with more pedestrains but fewer vehicles, the demands for the neural network algorithm may be higher than the demands for the neighboring vehicle algorithm. As discussed in further detail below, the adaptive parallel imaging processing system 150 assigns tasks to the available resources based, in part, upon the capabilities of the resources.

The memory 210 may also store a computational profile 214 of each processor 200. The computation profile 214 stores how long each processor 200 typically takes to execute a particular image processing task. The computational profile 214 may be determined, for example, experimentally in advance. A CPU for example, may be capable of processing the image data from all of the types of vehicle sensor 140 and processing any image processing technique. In contrast, an ASIC or FPGA specifically designed or programmed to process data from a single type of vehicle sensor 140, a subset of the types of vehicle sensor 140, a single image processing technique or a subset of the image processing techniques. Depending upon how the ASICs and FPGAs are programmed or designed, they may be able to process data from the respective vehicles sensor 140 more quickly than a more generic CPU or more slowly if they are not optimized for a particular task. Table 2 illustrates an exemplary computation profile 214 for the processors illustrated in Table 1.

TABLE 2

|  | P1 | P2 | P3 | P4 | P5 | P6 |
|---|---|---|---|---|---|---|
| K1 | T1 | T5 | T9 | X | T13 | X |
| K2 | T2 | T6 | X | T12 | T14 | X |
| K3 | T3 | T7 | T10 | X | T15 | T17 |
| K4 | T4 | T8 | T11 | X | T16 | T18 |

In Table 2, T1-T18 represent the times that each processor P1-P6 takes to process data from each sensor type K1-K4. Even though processor P1 and P2 are CPUs in this example, the CPUs may still have different capabilities depending upon, for example, the hardware architecture, clock speed, bus speed, or the like. As with Table 1, Table 2 is merely an example. The number of processors, the types of processors and the capabilities of the processor can vary depending upon the needs of the system.

The adaptive parallel imaging processing system 150 further includes a resource management system 220. In one embodiment, for example, the resource management system 220 may be implemented via one or more of the processors 200. Non-transitory computer-readable instructions which when executed by a processor 200 implement the resource management system 220 may be stored in the memory 210. As illustrated in FIG. 2, the resource management system 220 is connected to the vehicle sensor 140, the memory 210 and the processors 200 via communication buses. The resource management system monitors the availability and utilization of the processors 200 and dynamically schedules image processing requests on the processors 200, as discussed in further detail below.

The resource management system 220 includes an execution monitor 230. The execution monitor 230 monitors the executions being performed on each processor 200 and computes an average utilization over a moving time window for each processor 200. In other words, the execution monitor 230 determines an average time that each processor 200 is processing image data rather than being idle during the moving window. The moving window may be uniform in time scale across all of the processors 200. In other words, the average moving window is calculated for each processor 200 over the same time period.

FIG. 3 is a chart illustrating an example of the utilization of processors P1 and P3 from Tables 1 and 2, in accordance with an embodiment. Each block 300 in FIG. 3 represents the processor P1 and P3 executing a different process K1, K2, K3 or K4 over different time periods. In the example illustrated in FIG. 3, three time periods are represented. The first time period is the time between t0 and t0+Δt. The second time period is the time between t0+Δt and t0+2Δt. The third time period is the time between t0+2Δt and t0+3Δt. Δt is a fixed time which may be set by, for example, the manufacturer of the vehicle 100 or the autonomous vehicle control imaging system 130. In one embodiment, for example, Δt may be ten milliseconds, however Δt can be set to be larger or smaller depending upon how large of a window is desired.

The utilization for each time period for each processor 200 is based upon a ratio of the execution time used during a time period over the Δt. For example, the utilization for a time period may be calculated according to:

$$u^{\Delta t} = \frac{\Sigma(f-s)}{\Delta t},$$

where $u^{\Delta t}$ is a utilization of a processor over a period (e.g., the first, second or third period described above), f is a stop time for each respective execution during the period, s is a start time for each respective execution during the period and Δt is the length of time of the period. As seen in FIG. 3, several executions may be performed during each time period which may or may not be completed during the time period. For example, the execution 310 spans the first and second time period. The start time s for the calculation starts when either the processor goes from idle to busy (e.g., s1, s2, s4, s5, s6, s7, s8 in FIG. 3), or when a new time period begins when the device is already busy (e.g., s3 in FIG. 3). The finish time f ends when a processor goes from busy to idle (e.g., f1, f3, f4, f5, f6, f7 and f8), or at the completion of a time period (i.e., f2). As an example, the utilization for processor P1 during the first time period would be the sum of the difference between the finish time f1 and the start time s1 and the finish time f2, which ends at the end of the first period, and the start time s2 (i.e., (f1−s1) +(f2−s2)), divided by the length of the time period Δt (e.g., 10 milliseconds).

Returning to FIG. 2, the execution monitor 230 may calculate the average utilization of each processor 200 over a moving time window of a fixed number of time periods. In one embodiment, for example, the moving time window may be, for example, the twenty most recent time periods. However, the size of the moving window may vary. In one embodiment, for example, the execution monitor 230 may utilize circular buffers to store the utilization percentage for the fixed number of time periods. Each processor 200 may be associated with a separate circular buffer. Each circular buffer may have a fixed size based upon the size of the moving window where the utilization percentage of the most recent time period overwrites the utilization percentage of the oldest time period. The average utilization of each processor 200 can be calculated by averaging the utilization percentages stored in the circular buffer. The calculated average utilization percentages for each processor 200 may be stored in an utilization lookup table 235 for scheduling future image processing tasks, as discussed in further detail below. By calculating utilization in fixed time periods, rather than at the start and end of computations, the execution monitor can more accurately capture the average utilization of the processors 200.

The adaptive parallel imaging processing system 150 may further include a service scheduler 240. The service scheduler 240 schedules image processing tasks to be processed by the processors 200. In one embodiment, for example, the service scheduler 240 may create and maintain a request queue 250 for each processor 200, the request queue 250 storing a list of scheduled tasks to be performed in the order of the queue by the respective processor 200. In other words, the request queue 250 is an array of queues, each queue dedicated to one processor 200.

The service scheduler 240 utilizes a task pool 260 to control the execution of the requests in the request queue. The task pool includes predefined tasks corresponding to each possible processing task executing on each possible processor 200. As discussed in further detail below, the service scheduler 240 schedules image processing tasks into the request queues 250 from the task pool 260 based upon a priority of the image processing tasks, any dependencies associated with the task, and the capabilities of the processors 200.

FIG. 4 illustrates a method 400 for operating the adaptive parallel image processing system 150, in accordance with an embodiment. The execution monitor 230, the service scheduler 240 and the processors 200 execute in parallel. In other words, the execution monitor 230 continuously updates that utilization lookup table at the same time that the service scheduler 240 schedules image processing requests utilizing the lookup table while the processors 200 process queued requests.

As discussed above, the execution monitor 230 calculates the utilization for each time period for each processor 200. (Step 405). The utilization is a percentage of time each respective processor 200 is processing image data during a fixed time period. The execution monitor 230 stores the calculated utilization for each processor 200 in a dedicated buffer associated with each respective processor 200. (Step 410). As discussed above, the buffer may be a circular buffer of a predetermined size configured to overwrite the oldest entry with the newest entry.

The execution monitor 230 then calculates an average utilization for each processor 200 over a moving window. (Step 415). The moving window is a predetermined number of time periods. In one embodiment where a circular buffer is used, the size of the moving window may be equal to the size (i.e., the number of possible entries) in the circular buffer. In this embodiment, the execution monitor 230 may simply sum all of the entries in the respective circular buffer to determine the average utilization for the respective processor 200. In another embodiment, for example, the circular buffer may be one entry larger than the moving window. In this embodiment, the execution monitor 230 may determine the average utilization according to $$U(t) = U(t-1) + \frac{u^{t+n} - u^t}{n},$$

where U(t) is the current average utilization, U(t−1) is the previously calculated utilization, $u^t$ is the oldest utilization stored in the circular buffer, $u^{t+n}$ is the newest utilization stored in the circular buffer and n is the size of the moving window. When the circular buffer includes one extra entry than the moving window, the execution monitor 230 can simply determine the current average utilization by subtracting the oldest entry in the circular buffer and adding the newest entry in the circular buffer divided by the size of the moving window. During the next iteration, the previously calculated oldest time $u^t$ is overwritten by a new $u^{t+n}$. The execution monitor 230 can thus simply calculate the new U(t) by determining the locations of the new oldest entry $u^t$ and the location of the newest entry $u^{t+n}$ in the circular buffer. By calculating the average utilization of each processor 200 in this manner, the execution monitor 230 minimizes the time required to calculate the average utilization of each processor 200.

The calculated average utilization over the moving window for each processor 200 may then be stored in a lookup table. (Step 420). As discussed in further detail below, the service scheduler 240 utilizes the lookup table when determining which processor 200 to assign new tasks to.

The service scheduler 240 first receives a new image processing request. (Step 425). The new image processing requests are received from the sensors 140. The frequency at which the image processing requests are received and the type of image processing requests that are received are variable depending upon a driving scenario. For example, some sensors may perform better in daylight while others may perform better at night. As such, the frequency at which a certain sensor data or image processing techniques are used can vary depending upon the time of day. Likewise, some sensors or image processing techniques may be needed more in urban areas, while others may be needed more in suburban areas. Likewise, certain sensors or image processing techniques may be needed more in certain weather conditions, highway versus city driving or the like. The vehicle motion control system 120 may determine the driving scenario and thus which sensors are operating or which image processing techniques are required and the frequency of the image processing requests therefrom. Because the frequency and types of image processing request are variable, one benefit of the autonomous vehicle control imaging system is that the adaptive parallel image processing system 150 can optimize the processing of the variable image processing requests using all of the available processors 200, as discussed in further detail below.

The service scheduler 240 then determines if the image processing request is dependent upon another image processing request. (Step 430). For example, multiple filters may be applied to a single image taken by an optical camera sensor. A second filter may have to be applied to image data filtered by a first filter (i.e., the second filter cannot be applied until the first filter is applied). In one embodiment, for example, an image processing request may include a list of other image processing tasks that must be completed before the respective image processing task may be executed. The list may be generated, for example, before the request is even sent to the service scheduler 240. In one embodiment, for example, the list may be user-specified through an application programming interface (API) call. For example, an API call image_proc( )can be generated as image_proc(f2, <fx,f1>, <dev0, dev1>), indicating f2 depends on fx and f1 and can run on dev0 and dev1. In another embodiment, for example, the autonomous vehicle control imaging system 130 may intercept the request and generates the list based on their data dependencies. For example, if the request use OpenVX API standard, the node dependencies can be extracted.

If an image processing request is dependent upon another image processing request, the service scheduler 240 determines which processor 200 is processing or scheduled to process the dependent image processing request. (Step 435). As discussed above, each processor 200 is associated with a unique request queue 250. The service scheduler 240 may search the request queue 250 to determine which processor 200 is handling the dependent image processing request.

After determining which processor 200 is handling the dependent image processing request, the service scheduler 240 determines if the processor 200 handling the dependent image processing request can process the new image processing request. (Step 440). The service scheduler 240 determines that the processor 200 can process the new image processing request when the respective processor 200 has the ability to processes the type of the image processing request and the processor 200 has the processing capacity to processes the image processing request. As discussed above, the capabilities of each processor 200 are stored processor capabilities 212 stored in the memory 210. Furthermore, the utilization of the respective processor 200 is stored in the utilization table 235. Accordingly, the service scheduler 240 may determine that the respective processor 200 handling the dependent image processing request can process the new image processing request when the processor 200 is capable of processing the type of the image processing request according to the stored processor capabilities 212 and that a total utilization of the respective processor 200, based upon a combination of the current utilization of the respective processor 200 as stored in the utilization table 235 and the time the respective processor 200 takes to execute the new task according to the computational profile 214, would not exceed the capabilities of the processor 200. In other words, if the time it would take the processor 200 to process the new image processing task according to the computational profile 214 would cause the utilization of the respective processor 200 to exceed one-hundred percent utilization, the service scheduler 240 would determine that the respective processor 200 cannot processes the new image processing request.

When the processor 200 which is processing the dependent image processing request can process the new image processing request, the service scheduler 240 will select the respective processor 200 to process the new image processing request. (Step 445). This follows the design principle of processor affinity, which has many benefits, for example, lower overhead, less context switch and communication, data locality and reuse, and the like. Timing constraint can also be met, as far as the respective processor 200 can handle the request (total utilization does not exceed capability). This follows real-time scheduling theory (i.e., fixed priority-based scheduling).

If the respective image process request is not dependent on any other image processing requests as determined in Step 430 or if the processor 200 handling the dependent image processing request cannot process the new image processing request as determined in Step 440, the service scheduler 240 selects the least utilized processor 200 capable of processing the request. (Step 450). As discussed above, the capabilities of each processor 200 are stored processor capabilities 212 stored in the memory 210 and the execution monitor 230 tracks and monitors the utilization of each processor 200 in a utilization lookup table 235. Accordingly, the service scheduler 240 can select the least utilized processor 200 capable of processing the image by cross referencing the stored processor capabilities 212 and utilization lookup table 235. When selecting a least utilized processor 200, the service scheduler 240 selects the processor 200 which would be the least utilized after the new processing task were added to the request queue 250 for the respective processor. In other words, the service schedule takes into account the processor capabilities 212 when selecting which processor 200 to assign the new image processing task. As an illustrative example, suppose Processor A can handle the new image processing request in 10 ms but has 50% utilization and Processor B can handle the new image processing request in 40 ms but has a 25% utilization. In this example, suppose the new image processing request were coming in every 30 ms (the frequency of the request may be determined by the vehicle motion control system 120 as discussed above), the utilization of Processor A would be 85% (e.g., the previous 50% utilization plus a new 33% utilization—the 10 ms Processor A would take to process the request divided by the frequency of that request, namely 30 ms). Using the same 30 ms frequency, the utilization of Processor B would be greater than 100% (25% original utilization plus 40 ms/30 ms), so the service scheduler 240 will select Processor A for the request. If the new image processing request has a frequency of 200 ms, then Processor A would have a utilization of 50%+5%=55% and Processor B would have a utilization of 25%+20=45%, thus the request will be scheduled to run on Processor B.

After the service scheduler 240 selects a processor 200 in Step 445 or Step 450, the service scheduler 240 inserts the new image processing request into the request queue 250 for the respective processor according to the priority of the new request and the priority of the requests already in the respective request queue 250. (Step 455). The priority of the request may be based upon a location of the sensor 140 upon which the request has been generated from, a status of the vehicle, a situation around the vehicle, or the like, or any combination thereof. A status may be, for example, a direction the vehicle is traveling. For example, image data from a sensor 140 arranged to collect data in front of the vehicle 100 may have a higher priority than image data from a sensor 140 arranged to collect data behind the vehicle 100 when the vehicle is traveling forwards. Conversely, image data from a sensor 140 arranged to collect data behind the vehicle 100 may have a higher priority than image data from a sensor 140 arranged to collect in front of the vehicle 100 when the vehicle is in reverse. The situation around the vehicle 100 may include, for example, time of day, weather, location (e.g., urban, countryside, etc.), or the like.

One benefit of the adaptive parallel image processing system 150 is that no processor 200 is dedicated to a single sensor 140. By assigning image processing tasks to the least utilized processor 200 capable of performing the image processing task, the adaptive parallel image processing system 150 more efficiently utilizes the processing resources of the autonomous vehicle control imaging system 130. Furthermore, because the request queue 250 are an array of queues, each devoted to a single processor 200, and the service scheduler 240 arranges the image processing tasks in order of priority in each request pool, the processors 200 can receive and process the image processing tasks more quickly than using a single task queue.

In parallel to the operation of the execution monitor 230 and the service scheduler 240, the processors 200 process the image processing requests. (Step 460). The task pool 260 bound to each processor 200 controls the execution of the image processing request. In particular, the task pool polls the respective request queue 250 for the respective processor 200, sends the image processing task at the head of the queue to the processor 200, then goes to suspend until the processes is complete, locking the processor 200 for any other action until the process is complete. If a request at the head of a respective request queue is dependent upon another request which is not completed, the task pool 260 will select the next request in its queue to process.

The vehicle motion control system 120 then generates the vehicle system instructions based upon the processed image processing tasks. (Step 465). The processed results from Step 460 may include, for example, detected objects, object positions, estimated object motion and the like. The vehicle motion control system 120 generates commands for longitudinal and lateral motion (i.e., steering, acceleration, braking or the like), in response to the processed image data.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A vehicle, comprising:
   at least one vehicle system controlling at least one of a steering, a braking and an acceleration of the vehicle;
   a vehicle motion control system, the vehicle motion control system configured to generate instructions to control the at least one vehicle system; and
   an autonomous vehicle control imaging system configured to generate instructions to the vehicle motion control system, comprising:

a plurality of vehicle sensors; and
an adaptive parallel imaging processing system configured to process image data from the plurality of sensors, comprising:
a plurality of processors; and
a resource management system, the resource management system comprising:
an execution monitor, the execution monitor configured to calculate an average utilization of each of the plurality of processors over a moving window; and
a service scheduler, the service scheduler controlling a request queue for each of the plurality of processors, the service scheduler scheduling image processing tasks based upon image data from the plurality of sensors in the respective request queue for the each of the plurality of processors based upon the average utilization of each of the plurality of processors over the moving window, capabilities of each of the plurality of processors, and a priority associated with each image processing task,
wherein the plurality of processors are configured to process image processing tasks in order according to the respective request queue for each of the plurality of sensors and the autonomous vehicle control imaging system is configured to generate the instructions to the vehicle motion control system based upon the processed image processing tasks.

2. The vehicle of claim 1, wherein the moving window comprises a predetermined number of fixed time periods, the fixed time periods identical across all of the plurality of processors, wherein the execution monitor calculates the utilization of each of the plurality of processors for each fixed time period in the moving window.

3. The vehicle of claim 2, wherein the predetermined number of fixed time periods are stored in a plurality of circular buffers, each circular buffer associated with one of the plurality of processors.

4. The vehicle of claim 3, wherein the execution monitor calculates the average utilization of each of the plurality of processors over the moving window by calculating an average value of each of the plurality of circular buffers.

5. The vehicle of claim 1, wherein the plurality of processors include at least one central processing unit, at least one graphical processing unit, at least one application specific integrated circuit and at least one field programmable gate array.

6. The vehicle of claim 1, wherein the service scheduler schedules the image processing tasks in the request queues for each of the plurality of processors by:
receiving a new image processing request;
determining when the new image processing request is dependent upon a different image processing request;
determining, when the new image processing request is dependent upon the different image processing request, which of the plurality of processors is assigned to processes the different image processing request;
selecting the respective processor assigned to processes the different image processing request to process the new image processing request when the respective processor is capable of processing the new image processing request;
selecting a least utilized processor from the plurality of processors to process the new image processing request when the new image processing request is not dependent upon the different image processing request and when the processor assigned to processes the different image processing request is not capable of processing the new image processing request; and
inserting the new image processing request into the request queue associated with the selected processor according to a priority associated with the new image processing request.

7. The vehicle of claim 6, wherein the priority is based upon which of the plurality of sensors generated the image data associated with the new image processing request.

8. A method for controlling at least one vehicle system for a vehicle, comprising:
receiving, by an adaptive parallel imaging processing system, image data from a plurality of sensors;
determining, by an execution monitor of the adaptive parallel imaging processing system, an average utilization of each of a plurality of processors of the adaptive parallel imaging processing system over a moving window;
scheduling, by a service scheduler of the adaptive parallel imaging processing system, image processing tasks into a request queue for each of the plurality of processors based upon the average utilization of each of the plurality of processors over the moving window, capabilities of each of the plurality of processors, and a priority associated with each image processing task;
processing, by each of the plurality of processors, image processing tasks from the respective request queue associated with each of the plurality of processors; and
generating, by an autonomous vehicle control system, instructions to control at least one vehicle system based upon the processed image processing tasks, the instructions controlling at least one of an acceleration, a braking and a steering of the vehicle.

9. The method of claim 8, wherein the moving window comprises a predetermined number of fixed time periods, the fixed time periods identical across all of the plurality of processors, wherein the execution monitor calculates the utilization of each of the plurality of processors for each fixed time period in the moving window.

10. The method of claim 9, wherein the predetermined number of fixed time periods are stored in a plurality of circular buffers, each circular buffer associated with one of the plurality of processors.

11. The method of claim 10, wherein the execution monitor calculates the average utilization of each of the plurality of processors over the moving window by calculating an average value of each of the plurality of circular buffers.

12. The method of claim 8, wherein the scheduling further comprises:
receiving a new image processing request;
determining when the new image processing request is dependent upon a different image processing request;
determining, when the new image processing request is dependent upon the different image processing request, which of the plurality of processors is assigned to processes the different image processing request;
selecting the respective processor assigned to processes the different image processing request to process the new image processing request when the respective processor is capable of processing the new image processing request;
selecting a least utilized processor from the plurality of processors to process the new image processing request when the new image processing request is not dependent upon the different image processing request and when the processor assigned to processes the different image processing request is not capable of processing the new image processing request; and inserting the new image processing request into the request queue associated with the selected processor according to a priority associated with the new image processing request.

13. The method of claim 12, wherein the priority is based upon which of the plurality of sensors generated the image data associated with the new image processing request.

14. An autonomous vehicle control imaging system, the autonomous vehicle control imaging system configured to generate instructions to control at least one vehicle system, the autonomous vehicle control imaging system comprising:
  a plurality of vehicle sensors; and
  an adaptive parallel imaging processing system configured to process image data from the plurality of sensors, comprising:
    a plurality of processors; and
    a resource management system, the resource management system comprising:
      an execution monitor, the execution monitor configured to calculate an average utilization of each of the plurality of processors over a moving window; and
      a service scheduler, the service scheduler controlling a request queue for each of the plurality of processors, the service scheduler scheduling image processing tasks based upon image data from the plurality of sensors in the respective request queue for the each of the plurality of processors based upon the average utilization of each of the plurality of processors over the moving window, capabilities of each of the plurality of processors, and a priority associated with each image processing task,
    wherein the plurality of processors are configured to process image processing tasks in order according to the respective request queue for each of the plurality of sensors and the autonomous vehicle control imaging system is configured to generate the instructions to control the at least one vehicle system based upon the processed image processing tasks.

15. The autonomous vehicle control imaging system of claim 14, wherein the moving window comprises a predetermined number of fixed time periods, the fixed time periods identical across all of the plurality of processors, wherein the execution monitor calculates the utilization of each of the plurality of processors for each fixed time period in the moving window.

16. The autonomous vehicle control imaging system of claim 15, wherein the predetermined number of fixed time periods are stored in a plurality of circular buffers, each circular buffer associated with one of the plurality of processors.

17. The autonomous vehicle control imaging system of claim 16, wherein the execution monitor calculates the average utilization of each of the plurality of processors over the moving window by calculating an average value of each of the plurality of circular buffers.

18. The autonomous vehicle control imaging system of claim 17, wherein the service scheduler schedules the image processing tasks in the request queues for each of the plurality of processors by:
  receiving a new image processing request;
  determining when the new image processing request is dependent upon a different image processing request;
  determining, when the new image processing request is dependent upon the different image processing request, which of the plurality of processors is assigned to processes the different image processing request;
  selecting the respective processor assigned to processes the different image processing request to process the new image processing request when the respective processor is capable of processing the new image processing request;
  selecting a least utilized processor from the plurality of processors to process the new image processing request when the new image processing request is not dependent upon the different image processing request and when the processor assigned to processes the different image processing request is not capable of processing the new image processing request; and
  inserting the new image processing request into the request queue associated with the selected processor according to a priority associated with the new image processing request.

19. The autonomous vehicle control imaging system of claim 18, wherein the priority is based upon which of the plurality of sensors generated the image data associated with the new image processing request.

* * * * *